United States Patent [19]

Winchell et al.

[11] 3,875,299

[45] Apr. 1, 1975

[54] TECHNETIUM LABELED TIN COLLOID RADIOPHARMACEUTICALS

[75] Inventors: Harry S. Winchell, Lafayette; Morton Barak; Parmer Van Fleet, III, both of Walnut Creek, all of Calif.

[73] Assignee: Medi-Physics, Inc., Nutley, N.J.

[22] Filed: May 5, 1972

[21] Appl. No.: 250,738

[52] U.S. Cl. ............... 424/1, 250/303, 252/301.1 R
[51] Int. Cl. ............................................. A61k 27/04
[58] Field of Search .................. 424/1; 252/301.1 R; 23/230 B; 250/303; 260/429 R

[56] References Cited
OTHER PUBLICATIONS

Charamza; Chemical Abstracts, Vol. 72, 1970, page 86, Item No. 87066; [QD1.A51].

Morcellet; Nuclear Science Abstracts, Vol. 24, No. 4, Feb. 28, 1970, p. 617, Item No. 6078 [QC770N96].

Morcellet et al., Journal de Biologie et de Nucleaires, Vol. 4, No. 17, May–June, 1969, pp. 16–18.

*Primary Examiner*—Benjamin R. Padgett
*Attorney, Agent, or Firm*—Samuel L. Welt; Jon S. Saxe; R. Hain Swope

[57] ABSTRACT

An improved 99m- technetium labeled tin(II) colloid, size stabilized for reticuloendothelial organ imaging without the use of macromolecular stabilizers and a packaged tin base reagent and improved method for making it.

5 Claims, No Drawings

TECHNETIUM LABELED TIN COLLOID RADIOPHARMACEUTICALS

This invention relates generally to 99m-technetium labeled tin(II) colloids useful for scintigraphic imaging of reticuloendothelial organs and more particularly relates to an improved 99m-technetium-tin(II) colloid which is size-stabilized for liver, spleen and bone marrow scintigraphy without the use of macromolecular stabilizers.

One object of this invention is preparation of an improved size-stabilized technetium labeled tin colloid for reticuloendothelial organ imaging.

Other objects of this invention are improved methods for preparing technetium-tin colloid radiopharmaceuticals.

A further object of the invention is a packaged tin base reagent for preparing size-stabilized technetium labeled tin colloids and a simple method for using the reagent with generally available 99m-technetiumpertechnetate saline solutions.

Other objects and advantages of the invention will become apparent upon consideration of the following description of preferred embodiments of the colloids, the packaged reagent and the improved methods for the preparation of both.

Most radiocolloids require a stabilizing material, usually a macromolecule, to prevent adherence of the colloid to the walls of its container and agglomeration of the colloid particles into macroaggregates. While gelatin and dextran have been used for this purpose in the past, occasional adverse reactions have been associated with them. 99m-technetium-tin(II) colloids also have been prepared and the particle size stabilized in the range useful for reticuloendothelial organ imaging by another macromolecular stabilizer, human serum albumin, as is disclosed in the article entitled "A Simple 'Kit' Method for the Preparation of a Technetium-tin(II) Colloid and a Study of its Properties" by Max S. Lin and H. Saul Winchell in Journal of Nuclear Medicine Vol. 13, No. 1, pages 58–65. However, the efficiently labeled technetium-tin(II) colloid of this invention is prepared without the use of macromolecular stabilizers. An improved specially packaged tin base reagent is simply added to generally available 99m-technetium-pertechnetate saline solution to form an efficiently labeled tin colloid. The colloid has a particle size requisite for reticuloendothelial organ imaging and is sufficiently stable with time that macromolecular stabilizing materials are not required.

The reagent of this invention is a one millimolar solution of hydrolized stannous chloride in sterile pyrogen-free water in which the tin ions are maintained in their reduced tin(II) state. A nitrogen purged ampule aseptically encloses the tin chloride solution in a condition ready for use with a substantially unlimited shelf life. An exemplary ampule contains 2.2 ml. of 1m$\overline{\text{M}}$ hydrolized stannous chloride in sterile pyrogen free water (U.S.P.).

The improved reagent is mixed with 99m-technetium-pertechnetate in normal saline such as that generally eluted from technetium generators, to form an efficiently labeled technetium-tin(II) colloid which is size stabilized for scintigraphic imaging of liver, spleen and bone marrow. The colloid remains stable for a practical time period and does not appreciably aggregate into larger colloid particle sizes which are unsuitable for reticuloendothelial organ studies. No macromolecular stabilizers are required, as in the prior art, to maintain the proper particle size if the colloid is used within about a 24 hour period. It, of course, can be stabilized with a macromolecular material for longer term stability.

The size-stabilized technetium labeled tin(II) colloid is prepared and ready for injection in a simple four-step procedure. In the first step using an aseptic technique enough 99m-technetium-pertechnetate in normal saline solution is drawn into a syringe to provide the amount of radioactivity desired for administration to a single patient. This generally is in the order of 2–3 mCi. In a second step an ampule of the improved tin base reagent described above is opened aseptically and enough reagent is drawn into the same syringe containing the pertechnetate to result in a final proportion of one part by volume of reagent to one to four parts by volume of pertechnetate solution. In a third step a small volume of air is drawn into the syringe and the syringe shaken well for ten seconds to assure complete mixing. Then in the final fourth step for optimum results the efficiently labeled tin colloid is allowed to incubate at room temperature for 7 to 10 minutes after mixing. It then can be injected slowly intravenuously into the patient.

Accumulation of over 85 percent of the administered 99m-technetium radioactivity in liver and spleen of rats can be achieved with as little as one part of the improved tin base reagent to nineteen parts of 99m-technetium-pertechnetate in saline or as much as seven parts of improved tin base reagent to three parts of 99m-technetium-pertechnetate in saline. However, best results are achieved using one part reagent to one to four parts technetium-pertechnetate in saline. Formation of the labeled tin colloid is very rapid but for best results requires seven to ten minutes of incubation at room temperature prior to intravenous injection.

In vivo distribution of the improved colloid and radiation dose to various organs are comparable to those associated with other technetium labeled colloids. For 3m Ci of administered 99m-technetium this is in the order of 0.05 rads total body, 0.04 rads male gonads, 0.07 rads female gonads, 0.72–0.99 rads liver, 0.48–1.3 rads spleen, 0.07–0.10 rads red bone marrow.

The tin base reagent for preparing the improved colloid of this invention may be made by dissolving in sterile pyrogen-free water a tin chloride prepared from metallic tin reacted with hydrochloric acid or by adding anhydrous stannous chloride flakes to pyrogen-free water to a 1mM concentration. The tin ions must be kept in reduced Sn (II) state in order to size-stabilize the labeled tin colloid. This is accomplished by care in preparation to eliminate oxygen, other oxidants and trace elements which otherwise may act as oxidant or oxidizing catalysts for Sn (II). The aqueous tin solution is sterilized by passage through a 0.22–micron Millipore filter into sterile ampules, by subsequent purging of the air inside the ampule with Millipore filtered nitrogen and then by sealing the ampule.

The above examples and the described procedures are for illustrative purposes only. It will be apparent to those skilled in the art that both may be modified within the scope of the invention defined in the following claims.

We claim:

1. A 99m-technetium labeled tin(II) colloid which colloid is size-stabilized for scintigraphic imaging of reticuloendothelial organs including the liver, spleen and bone marrow without the presence of macromolecular stabilizers comprising mixed solutions of
hydrolized stannous chloride with its tin ions substantially maintained in their reduced tin(II) state; and
99m-technetium-pertechnetate in normal saline solution, the solutions being mixed at room temperature.

2. A method for instantly making a 99m-technetium labeled tin colloid, which colloid is size-stabilized for scintigraphic imaging of reticuloendothelial organs including the liver, spleen and bone marrow without the use of macromolecular stabilizers, comprising the steps of forming a solution containing stannous tin ions by dissolving stannous chloride in pyrogen-free water;
substantially eliminating all oxidants and oxidizing catalysts from said solution to maintain the tin ions in their reduced state; and
then mixing said solution at room temperature with 99m-technetium pertechnetate ions in normal saline solution to form said colloid.

3. The method of claim 2 wherein the stannous chloride is dissolved to about a one millimolar concentration and the pertechnetate ions are present in an amount to produce 2–3 millicuries of radioactivity.

4. The method of claim 2 further comprising the step of incubating the colloid at room temperature for about 7–10 minutes after mixing the stannous and pertechnetate ion solutions.

5. The colloid of claim 1 wherein the hydrolized stannous chloride is at about a one millimolar concentration and the 99m-technetium pertechnetate ions are in an amount producing about 2–3 millicuries of radioactivity.

* * * * *